United States Patent [19]

Broucksou et al.

[11] 4,428,248
[45] Jan. 31, 1984

[54] SHIFTING ACTUATOR

[75] Inventors: Robert H. Broucksou, Danville; George Martin, Lancaster; Richard J. Oster, Danville, all of Ky.

[73] Assignee: Eaton Corporation, Cleveland, Ohio

[21] Appl. No.: 255,581

[22] Filed: Apr. 20, 1981

[51] Int. Cl.³ ............... F16D 21/02; B60K 20/10; F16H 25/16

[52] U.S. Cl. .................................. 74/335; 74/55; 74/337.5; 74/470; 192/3.55; 192/48.91; 192/93 R; 192/109 A

[58] Field of Search ............... 192/0.08, 0.098, 3.55, 192/48.91, 93 R, 109 A; 74/55, 335, 337.5, 470

[56] References Cited

U.S. PATENT DOCUMENTS

| 2,634,622 | 4/1953 | Cripe | 74/335 |
|---|---|---|---|
| 2,684,739 | 7/1954 | Hasbrouck | 192/109 A X |
| 2,754,692 | 7/1956 | Russell | 74/473 R |
| 2,821,089 | 1/1958 | Russell | 74/335 |
| 2,858,714 | 11/1958 | Black | 74/740 |
| 3,132,531 | 5/1964 | Boughner | 74/335 |
| 3,195,371 | 7/1965 | Christie | 74/695 |
| 3,358,517 | 12/1967 | Nelson et al. | 74/110 |
| 3,368,638 | 2/1968 | Terry et al. | 180/22 |
| 4,207,780 | 6/1980 | Saxton | 74/710.5 |

FOREIGN PATENT DOCUMENTS

| 2268997 | 11/1975 | France | 74/55 |
| 45-15321 | 5/1970 | Japan | 74/335 |

Primary Examiner—Allan D. Herrmann
Attorney, Agent, or Firm—C. H. Grace; H. D. Gordon

[57] ABSTRACT

A shift actuator (10, 100, 200) for selectively shifting a shift member (12, 102) to one of at least two selectable operating positions is provided. The actuator includes a rotational member such as a cam (36) or scotch yoke flywheel (204) rotatably driven by a unidirectional rotational motor (26) to one of two or more selectable rotational positions, each of which rotational positions is effective to cause a single compression spring (56, 166) to urge an engagement member (64 and 66, 108) to axially move the shift member to one of the at least two selected positions.

20 Claims, 15 Drawing Figures

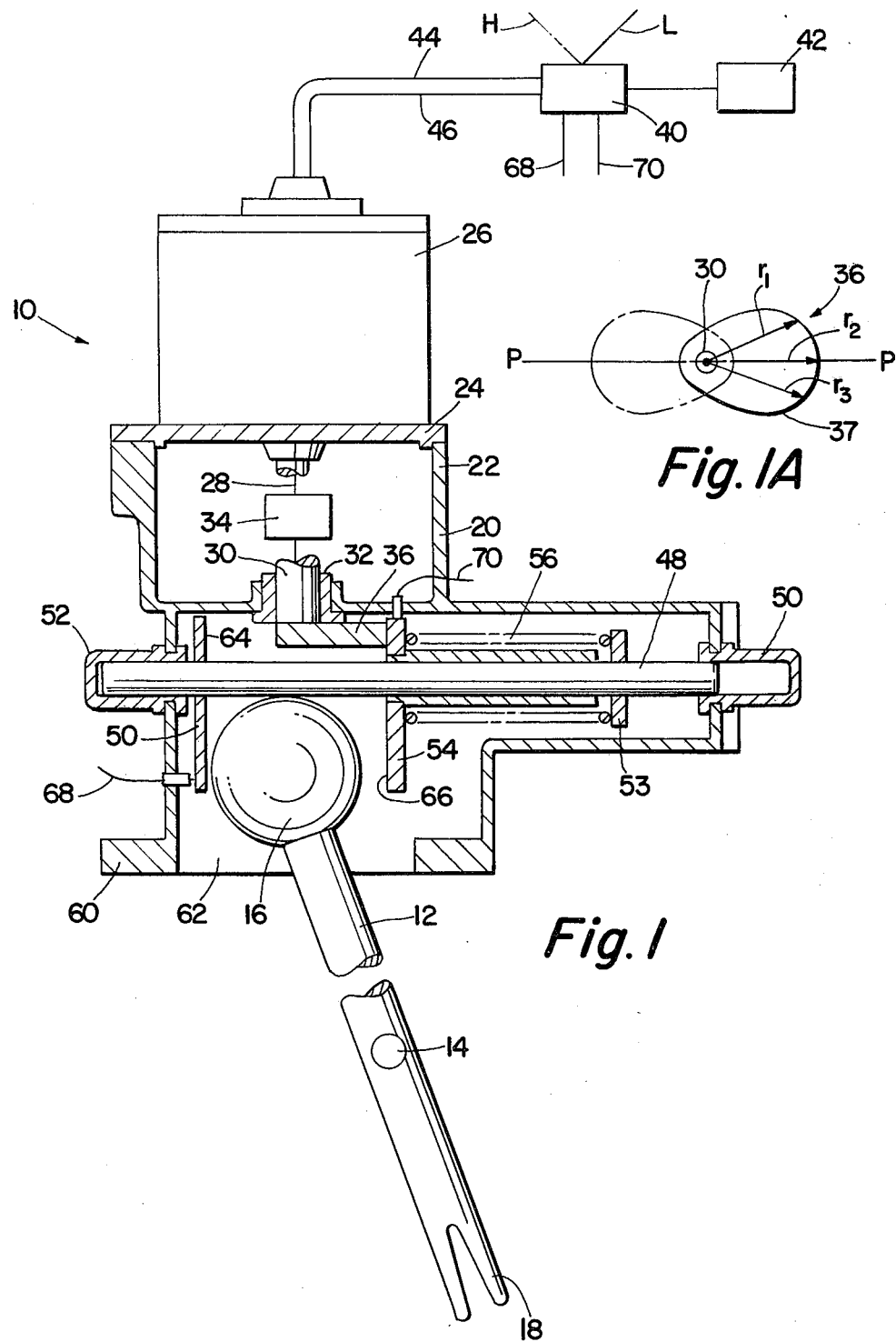

SHIFTING ACTUATOR

BACKGROUND OF THE INVENTION

1. Field of the Invention

The present invention relates to shifting actuators for selectively preloading a shifting mechanism to be shifted into a preselected one of at least two selectable operating positions. More particularly, the present invention relates to a shifting actuator for preloading a shifting mechanism to be shifted into a preselected one of at least two selectable operating positions which preferably utilizes a unidirectional rotational motor, preferably an electric motor, to drive a rotatable member, such as a cam, scotch yoke flywheel, or the like, which rotatable member is effective to axially compress a resilient biasing device, preferably a single compression spring, to preload, i.e. resiliently bias, the shifting mechanism toward the selected operating position.

2. Description of the Prior Art

Shift actuators, such as two-position shift actuators, for selectively shifting, or positioning, a shifting mechanism, such as a shift fork or the like, are well known in the prior art. Such mechanisms are typically utilized to engage one of two engagable gears, to engage or disengage a single gear, to engage or disengage a clutch, to engage or disengage a lockup device, such as a differential lockup, or the like. Examples of such devices may be seen by reference to U.S. Pat. Nos. 2,858,714; 3,195,371; 3,368,638 and 4,207,780, all of which are hereby incorporated by reference.

Two-position shift actuators allowing a shift to preselected by preloading of an element, usually a resilient element such as a spring, to bias the shifting mechanism, usually a shift fork, towards a preselected position are also well known in the prior art. Examples of such devices may be seen by reference to U.S. Pat. Nos. 2,754,692; 2,821,089 and 3,358,517, all of which are hereby incorporated by reference.

While the prior art two-position shift actuators allowing a shift to preselected were generally satisfactory, such devices are not totally satisfactory as the devices usually required a bidirectional linear or rotational motor, required or plurality of springs, utilized relatively expensive ball screw devices, utilized torsional springs and/or were undesirably complicated and/or expensive to produce.

SUMMARY OF THE INVENTION

In accordance with the present invention, many of the drawbacks of the prior art are minimized or overcome by the provision of a shift actuator, preferably but not limited to a two-position shift actuator, allowing preselection of a shift of a shift member to one of at least two selectable operating positions which may utilize a relatively inexpensive unidirectional rotational motor, preferably an electric motor, which utilizes a rotational member such as a cam, eccentric, scotch yoke flywheel or the like driven by the unidirectional or bidirectional rotational motor and which preferably utilizes a single coil spring which is axially compressed by selected rotational movement of the cam, eccentric, scotch yoke flywheel or the like to preload the shifting mechanism toward the preselected one of at least two selectable operating positions.

The above is accomplished by providing a rotational motor, which may be a unidirectional motor, preferably a unidirectional AC or DC electric motor, which motor is drivingly connected, preferably by a worm-worm wheel drive or a speed reducer connection, to the rotational cam, eccentric, scotch yoke flywheel or the like. The cam, eccentric, scotch yoke flywheel or the like has at least two selectable rotational positions. In the case of a two position shift actuator, the rotational positions are generally rotationally displaced by approximately 180° of rotational movement thereof, each of which rotational positions are effective to cause the single compression spring to load or to preload the shifting mechanism to one of the two selectable operating positions. Actuation switch control means, such as an operator actuated switch, are effective to cause the motor to rotate the cam, eccentric, scotch yoke flywheel or the like approximately 180° from its previous rotational position. As the cam, eccentric, scotch yoke flywheel or the like is effective to act upon the spring, and not directly upon the shifting mechanism, a shift may be selected and the shifting mechanism loaded or preloaded without regard for the instantaneous torque transmitting load and/or nonsynchronous conditions at the shifted members with confidence that the selected or preselected shift will be accomplished under the bias of the load or preload of the compression spring upon achievement of acceptable operating conditions of the shifted members.

Accordingly, it is an object of the present invention to provide a new and improved shift actuator.

A further object is to provide a new and improved shift actuator allowing preloading of shift mechanism to a selected one of at least two selectable operating positions which may utilize a unidirectional rotational motor to rotate a cam, eccentric, scotch yoke flywheel or the like to one of at least two rotational positions, each of said rotational positions effective to preload a compression spring to resiliently bias the shifting mechanism toward one of the selectable operating positions.

These and other objects and advantages of the present invention will become apparent from a reading of the description of the preferred embodiments taken in connection with the attached drawings.

BRIEF DESCRIPTION OF THE DRAWINGS

FIG. 1 is plan view, partially in section, of one embodiment of the shift actuator of the present invention.

FIG. 1A is an end view of the actuator cam of the present invention.

DESCRIPTION OF THE PREFERRED EMBODIMENT

Figure 2A:
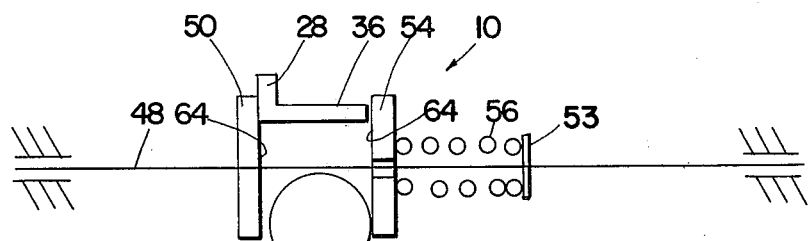
FIGS. 2A–2D are schematic illustrations of the various operating positions of the shift actuator of FIG. 1.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Two-position shift actuators effective to position a shift mechanism, such as a shift fork or the like, to one of two selectable operating positions are well known. The actuators are typically effective to cause pivoting movement of a pivoted shift fork or axial movement of a axially movable shift fork. An example of a pivoted shaft fork having two selectable operating positions may be seen by reference to U.S. Pat. No. 2,754,692, assigned to the assignee of this invention, wherein the therein illustrated shift fork 80 is pivotably shiftable to one of two selected positions to shift a two-speed axle under the influence of the therein illustrated actuator 100. The shift actuator of the present invention is especially well suited for shifting a pivoted shift fork, although its utility is not limited to such applications.

For purposes of illustration only, the detailed embodiments of the present invention will be illustrated as two-position shift actuators, it being understood that the present invention is not limited to only two-position shift actuators.

One embodiment of the present invention may be seen by reference to FIG. 1. In FIG. 1, the shift actuator 10 is adapted to act upon a shifting mechanism or member 12 to selectably position, or shift, the shift mechanism into one of two selectable operating positions. The shift mechanism 12 illustrated is a shift fork pivotably mounted at pivot point 14 and having a first end 16 acted upon by the actuator 10 and a second or forked end 18 designed to engage a member to be shifted (not shown), such as a gear, a clutch, a shaft or the like. As is well known in the art, and as may be seen by reference to FIGS. 2A to 2D, generally rightward and leftward pivotal movements of shift fork end 16 will result in generally leftward and rightward, respectively, pivotal movements of shift fork end 18. Within the limited pivotal movement of the illustrated shift fork 12, the movements of first end 16 and of forked end 18 may be considered substantially axial and forked end 18 may be utilized to axially shift a gear or clutch slidably received on a shaft or to axially shift a shaft slidably journaled in a housing.

The shift actuator 10 comprises a housing 20 which may be of a multiple piece construction for assembly purposes joined by suitable fasteners (not shown) or the like. The housing 20 includes an adapter flange 22 for receipt of the mounting flange 24 of a rotational motor 26. Preferably, the rotational motor 26 is a unidirectional AC electric motor or a unidirectional single winding DC electric motor. The output shaft 28 of the electric motor 26 is drivingly connected to a cam shaft 30 journaled for rotation in housing 20 at antifriction bushing or bearing 32. Various types of geared drives, such as speed reducer 34 may be interposed the motor output shaft 28 and the cam shaft 30. A rotary cam 36 is fixed to, or integral with, cam shaft 30 for rotation therewith.

A selectively actuatable switch control 40 having a connection to a source of electrical energy, such as a vehicle electric system 42, is provided to selectively energize the electrical motor through electrical connections 44 and 46, to drive the cam from one rotational position to a second rotational position approximately 180° of rotation offset from the first position, see the solid and dashed lines of FIG. 1A. In a typical situation, it is desirable to rotate the cam 180° in about 0.3 to 0.5 seconds, and thus for an 1800 rpm AC electric motor, a speed reducer 34 having a reduction of about 20:1 to 40:1 is desirable. If a 4000 rpm DC electric motor is utilized, as would be typical on a vehicle having a DC electric system, a speed reduction of about 50:1 to 100:1 is desirable.

A slide shaft 48 is slidably supported in housing 20 by guides 50 and 52 which may also act to seal the housing. Slide shaft 48 is axially movable in housing 20 along its axis which is generally perpendicular to the rotational axis of cam shaft 30 and cam 36.

A reaction plate or member 50 is axially fixed, as by welding or the like, to slide shaft 48 adjacent the leftward end thereof. A spring seat 53 is axially fixed, as by welding or the like, to slide shaft 48 adjacent the rightward end thereof. Although welding of reaction plate 50 and spring seat 53 to slide shaft 48 is illustrated, a single snap ring or the like to limit leftward axial movement of reaction member 50 relative to shaft 48 and a single snap ring or the like to limit rightward axial movement of spring seat 53 relative to the slide shaft 48 is suitable for purposes of operation of actuator 10. Reaction plate 50 and/or spring seat 53 may also be formed integrally with the slide shaft 48.

A slide plate or member 54 is slidably supported on slide shaft 48. A coil spring 56, shown in FIG. 1 in the axially compressed condition, surrounds slide shaft 48 and acts on slide plate 54 and spring seat 53. An elongated bushing 58 may be utilized to guide slide plate 54 on shaft 48 and to support the coil spring 56. Preferably, bushing 58 is of a low friction or self lubricating material.

The housing 20 includes a mounting flange 60 for mounting of the actuator to a housing (not shown) containing the members to be shifted, such as the housing of a change gear transmission, a two speed axle of the like. The flange 60 defines an aperture 62 of sufficient size to receive the end 16 of shift fork 12 and to permit sufficient pivotal movement thereof.

Reaction member 50 and slide plate 54 are of a shape that the axially inward surfaces, 64 and 66, respectively, thereof are engageable by both the cam 36 and the end 16 of shift fork 12.

As will be described in detail below, shifting of the shift fork from one operating position to the other operating position requires a substantially 180° rotation of cam 36. To accomplish such a rotation of cam 36, the toggle of switch 40 is moved to its desired location (shown here as "H" for high, and "L" for low, speed operation of the shifted mechanism). When a shift from a current operating position is selected, the switch control 40 will immediately cause rotation of unidirectional motor 26. Rotation of the cam will cause either the reaction plate 50 to move leftwardly, or the slide plate 54 to move rightwardly, until one of the contact sensors or limit switches 68 or 70 is contacted, sending a signal to switch control 40 to cease rotation of motor 26. The shift control 40 may be of any suitable circuitry and may allow motor 26 to stop by dynamic braking, coasting and/or a reversing braking current. The specific circuitry of switch control 40, the structure and operation of the sensors 68 and 70, and/or of the means to stop rotation of motor 26 forms no part of the present invention.

As may be seen by reference to FIG. 1A, cam 36 is configured such that radii $r_1$, $r_2$ and $r_3$ are substantially equal, thus rotation of approximately 150° to 210° from the position shown will be adequate to properly operate the actuator and thus stopping the cam at exactly 180° rotation is not critical to the correct operation of the actuator. It may also be seen that the radially outer periphery 37 of cam 36 is relatively smooth and continuous and that the outer periphery is generally symmetrical about a plane, p—p, containing the axis of rotation of the cam.

The operation of actuator 10 may be better understood by reference to FIGS. 2A to 2D.

In FIG. 2A, forked end 18 of shift fork 12 is in the leftward axial position ("L") and no shift therefrom has been selected. In this position rightward axial movement of the forked end is resisted by compression spring 56 lightly urging slide shaft 48 to the right (via spring seat 52) and thus urging reaction member 50 and shift fork end 16 to the right.

Figure 2B:
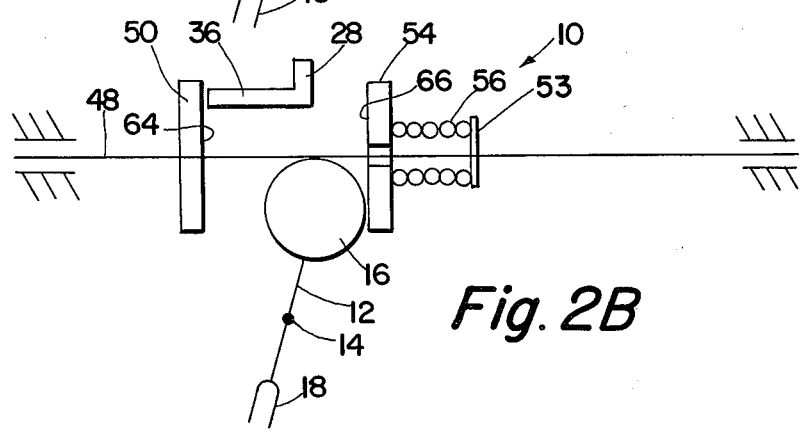

If the operator selects a shift to the "H" position, i.e. movement of the forked end 18 to the right, by movement of the toggle of the shift control 40, the motor 26 will cause the cam 36 to be rotated approximately 180° to the position shown in FIG. 2B. Rotation of the cam 36 will cause the reaction plate, and slide shaft 48 to be moved axially to the left until rotation is terminated as a result of plate 50, or shaft 48, contacting the sensor 68. Movement of shaft 48 to the left will cause spring seat 52 to axially compress spring 56 between itself and slide plate 54, preloading the slide plate 54 to the right. Axially inner surface 66 of slide plate 54 will bear on the end 16 of shift fork 12.

As the currently engaged gear or clutch being disengaged may be transmitting torque, or the selected gear or clutch may not be properly synchronized to be shifted, the actuator will remain in the preloaded condition of FIG. 2B until proper conditions for shifting occur. In this position, the compression spring will exert about 100–200 pounds of force on the shift fork end 16. When proper conditions for shifting do occur, the sliding plate 54, and shift fork end 16, will be moved axially to the left, pivoting forked end 18 to the right to the position seen in FIG. 2C.

Figure 2C:
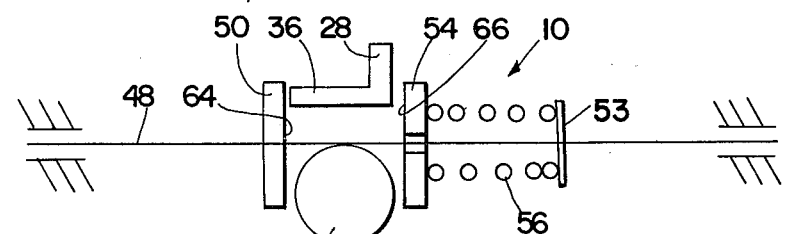
Figure 2D:
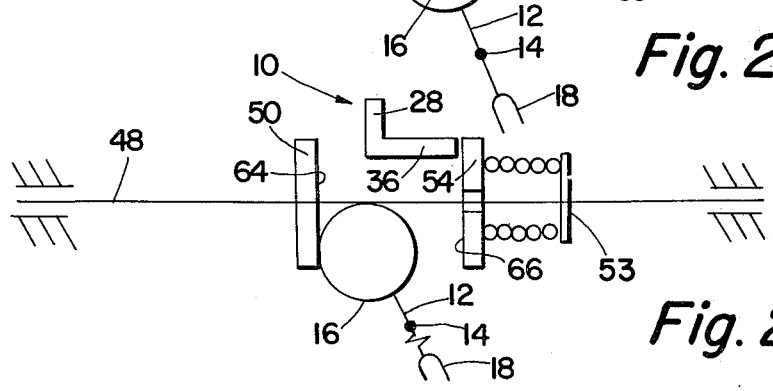

When in the position shown in FIG. 2C (i.e. in "H"), to shift to "L," the operator will move the toggle of switch control 40 to the "L" position, causing the motor 26 to rotate cam 36 approximately 180° to the position of FIG. 2D. Rotation of cam 36 will cause the slide plate 54 to move rightwardly relative to shaft 48 and housing 20 until the slide plate 54 contacts sensor 70 causing the control 40 to cease rotation of the motor 26 and cam 36. Rightward movement of the slide plate 54 will axially compress spring 56 between itself and the spring seat 52, causing the spring 56 to resiliently bias spring seat 52, shaft 48 and reaction plate 50 to the right. The inner axial surface 64 of reaction plate 50 will bear on the end 16 of shift fork 12 preloading the shift fork toward the position shown in FIG. 2A upon the occurrence of proper shifting conditions.

Figure 3:
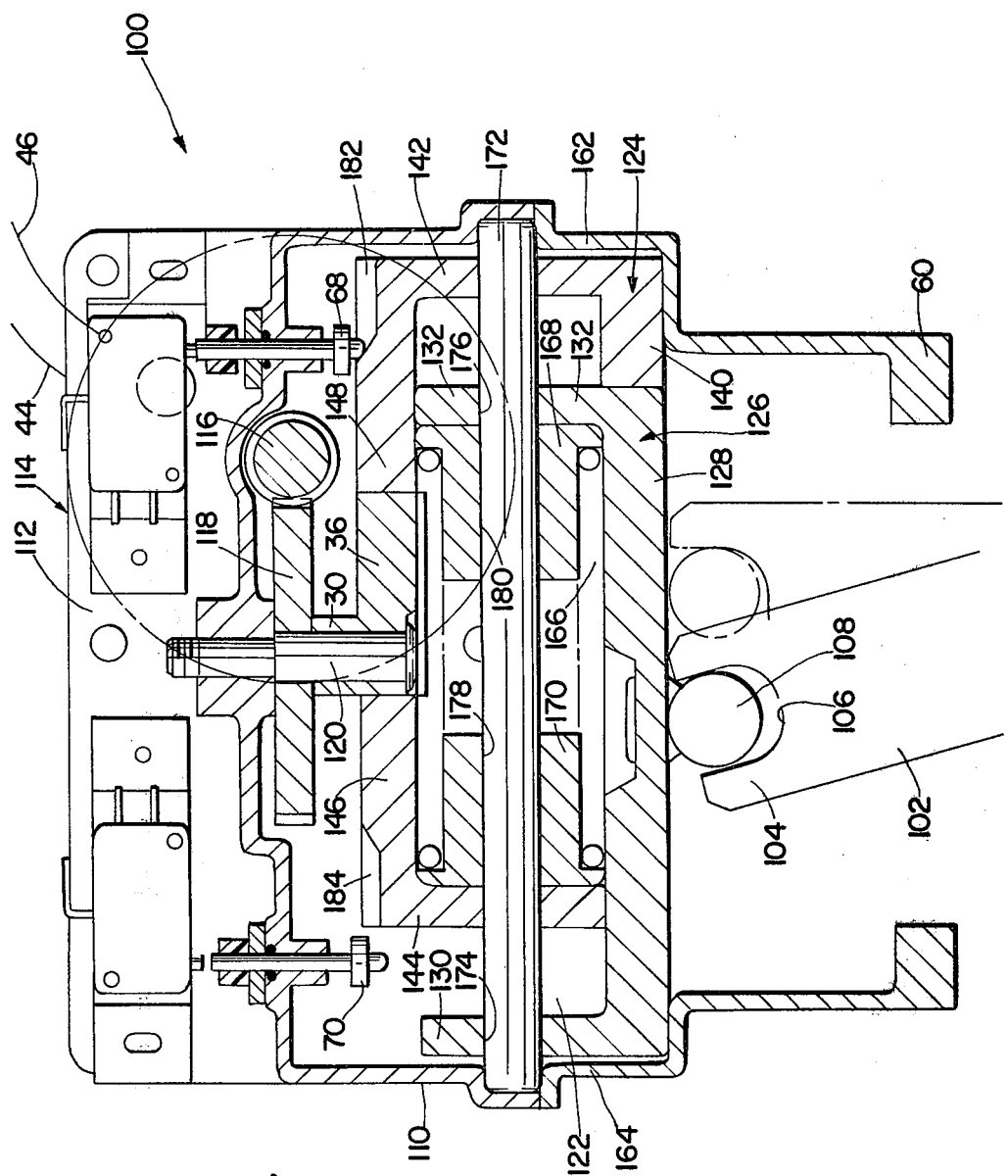
FIG. 3 is a plan view, partially in section, of an alternate embodiment of the present invention.
Figure 4A:
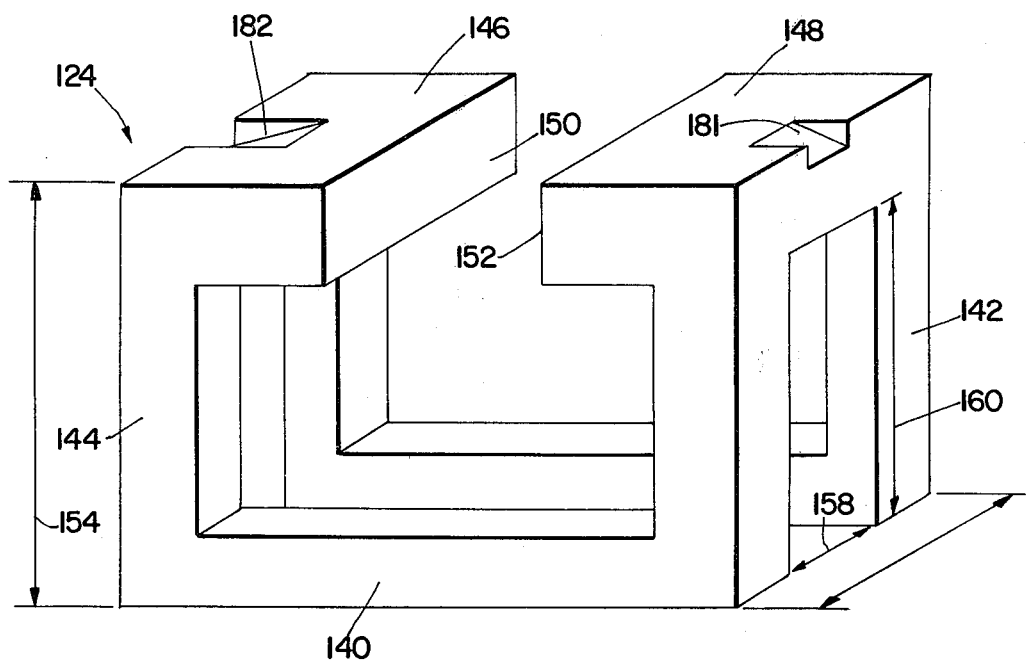
FIGS. 4A and 4B are perspective views of two of the members of the actuator of FIG. 3.
Figure 4B:
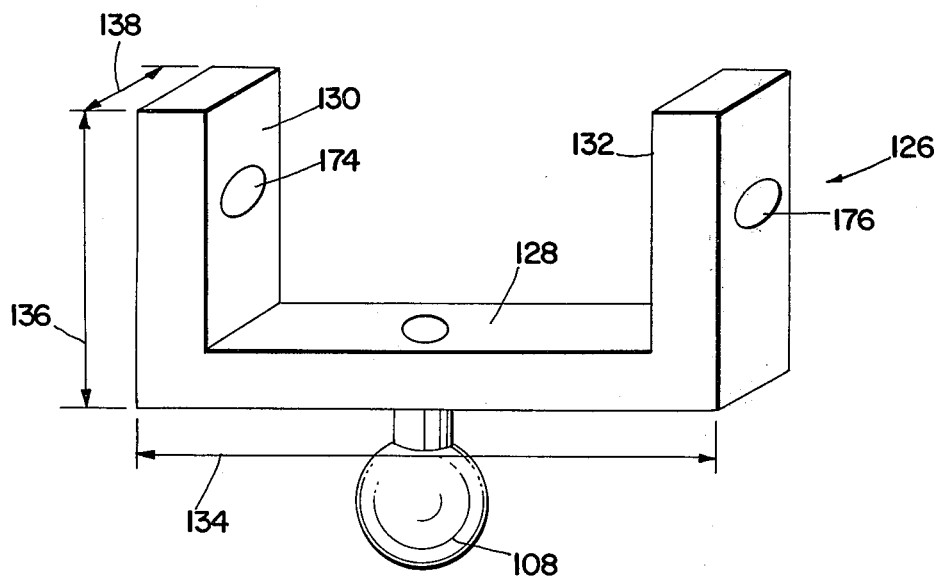

An alternate embodiment 100 of the present invention may be seen by reference to FIGS. 3, 4A and 4B. Elements of two position actuator 100 which are structurally and functionally identical, or substantially identical, to elements of the two position actuator 10 described above will be assigned like reference numerals.

Actuator 100 is adapted to act on a shift mechanism, such as shift fork 102, to position the shift fork into one of two selectable operating positions. The shift fork 102 is pivotably mounted at a pivot point (not shown) and has a first end 104 acted upon by the actuator 100 and a second end (not shown), preferably of a generally forked construction, designed to engage a member to be shifted. The first end 104 of shift fork 102 is provided with a slot 106 for pivotal receipt of a ball or cylinder structure 108 of actuator 100 to pivot the shift fork between the position illustrated in the solid lines and the position illustrated in the dashed lines of FIG. 3.

The shift actuator 100 comprises a housing 110 which may be of a multiple piece construction as is shown. The housing 110 includes a flange 112 for receipt of the mounting flange of a motor such as unidirectional motor 114, shown in dashed lines of FIG. 3. Preferably, the unidirectional motor 114 is a single winding, DC electric motor. The output shaft (not shown) of the motor 114 is drivingly connected to a cam shaft 30 journaled for rotation in housing 110. Various types of geared drives may be interposed the motor output shaft and the cam shaft 30. In the illustrated embodiment, the output shaft of the motor directly drives a worm 116 which is drivingly engaged to a worm gear 118 which is drivingly engaged to the cam shaft 30. A rotary cam 36 is fixed to cam shaft 30 for rotation therewith. Worm gear 118, cam shaft 30 and/or cam 36 may be integrally formed, as of a high strength plastic molding or the like. In the construction shown, the rotational axes of the motor 114 output shaft and worm 116 are generally perpendicular to, and offset from, the rotational axes of worm gear 118, cam shaft 30 and cam 36.

Electrical connection 44 and 46 connect the electric motor 114 to a switch control (similar to switch control 40 described above and not shown in FIG. 3), which switch control is selectively actuatable to cause motor 114 to rotate cam 36 from a first rotational position to a second rotational position generally 180° of rotation displaced from the first rotational position. In a typical situation, it is desired to rotate the cam 36 180° degree in about 0.3 to 0.5 seconds and the DC motor 114 will have a rotational speed of about 4000 rpm, and thus the worm-worm wheel gear connection will preferably provide a speed reduction of about 50:1 to 100:1. A shaft 120 may be utilized to rotationally journal the worm gear, cam shaft and cam assembly to the housing 110.

Housing 110 defines an internal cavity 122 in which a reaction member 124 and slide member 126 are slidably received and supported. The structural details of reaction member 124 and slide member 126 may be seen in more detail by reference to FIGS. 4A and 4B, respectively.

Slide member 126 is of a generally "U" shape comprising an axially extending bottom portion 128 and two upright portions 130 and 132. The bottom portion 128 is of a length 134, the upright portions, 130 and 132, are of a height 136 and all of the portions are of a width 138. Ball 108 is fixed to the bottom portion 128 for axial movement with the slide member.

Reaction member 124 comprises an axially extending bottom portion 140, two upright portions 142 and 144, an axially inwardly extending top portion 146 extending from upright portion 144 and an axially inwardly extending top portion 148 extending from upright portion 142. Top portions 146 and 148, respectively, define axially inward faces, 150 and 152, respectively, for engagement by cam 36.

The length of reaction member bottom portion 140 is generally equal to the length 134 of bottom portion 128 of the slide member. The height 154 of the reaction member upright portions, 142 and 144, is greater than the height 136 of the slide member upright portions. The bottom portions 140 and upright portions, 142 and 144, of the reaction member 124, are provided with a slot 156 having a width 158 and height 160 greater than the width 138 and height 136, respectively, allowing the slide member 126 to slide therein. The slide member 126 and the reaction member 124 are independently axially slidable relative to housing 110.

Housing 110 includes two end walls, 162 and 164, respectively, which will limit the rightward and leftward axial movement, respectively, of the slide member 126 and the reaction member 124.

A coil compression spring 166, shown compressed in FIG. 4, is received between a pair of spring seat and guide members 168 and 170. Spring seat and guide members, 168 and 170, are of a greater width than slot 156 and thus will be limited in axially outward movement by the axially innermost ones of the slide or reaction member upright portions.

A guide shaft 172 may be fixed to housing 110 to properly position and guide the slide member 126 and the spring seat members 168 and 170. Bores 174 and 176 may be provided in the slide member upright portions, and bores 178 and 180 provided in the spring seats, for sliding receipt of the guide shaft 172.

The housing 110 includes a mounting flange 60 for mounting the actuator 100 to the housing of a two speed axle, a transmission, or the like.

A pair of sensors, 68 and 70, ride in ramped grooves 182 and 184, respectively, of the top portions, 146 and 148, respectively, of the reaction member to sense full rightward and leftward, respectively, axial movement of the reaction member. The function of contacts or sensors, 68 and 70, has been described above and will not be repeated.

In operation, the cam 36 is rotated to its rightward most position (as shown in FIG. 3) to select a rightward movement of shift fork end 104 (and corresponding leftward movement of the remote forked end of the shift fork). To shift the forked end of shift fork 102 to right, the cam 36 is rotated approximately 180° from the position shown to cause a leftward movement of shift fork end 104.

Rotation of cam 36 to its two selectable rotational positions, will cause the cam to engage either surface 150 or 152, respectively, of the reaction member 124 to move and retain the reaction member axially leftwardly or rightwardly, respectively, in housing 110. Such movement of the reaction member will cause the compression spring 166 to be axially compressed between the one of the spring seat and guide members, 168 and 170, which will move axially with the upright portions, 142 and 144, and the reaction member upright portions, 130 and 132, of the slide member 126, to resiliently bias the slide member, and ball or cylinder 108 and shift fork end 104, in the desired axial direction.

It may thus be seen that both the two-position shift actuator 10 and the two-position shift actuator 100 utilize a rotational cam 36, which may be rotated in either direction to two selectable rotational positions, rotationally displaced by approximately 180°, to axially compress a single compression spring to preload (resiliently bias) a shift member towards either one of two selectable operating positions. As the cam 36 may be rotated in either direction of rotation, a unidirectional motor may be utilized to selectively rotate the cam.

Of course, for reliability and/or safety considerations, two more concentric and/or parallel coil springs may be utilized.

Figure 5A:
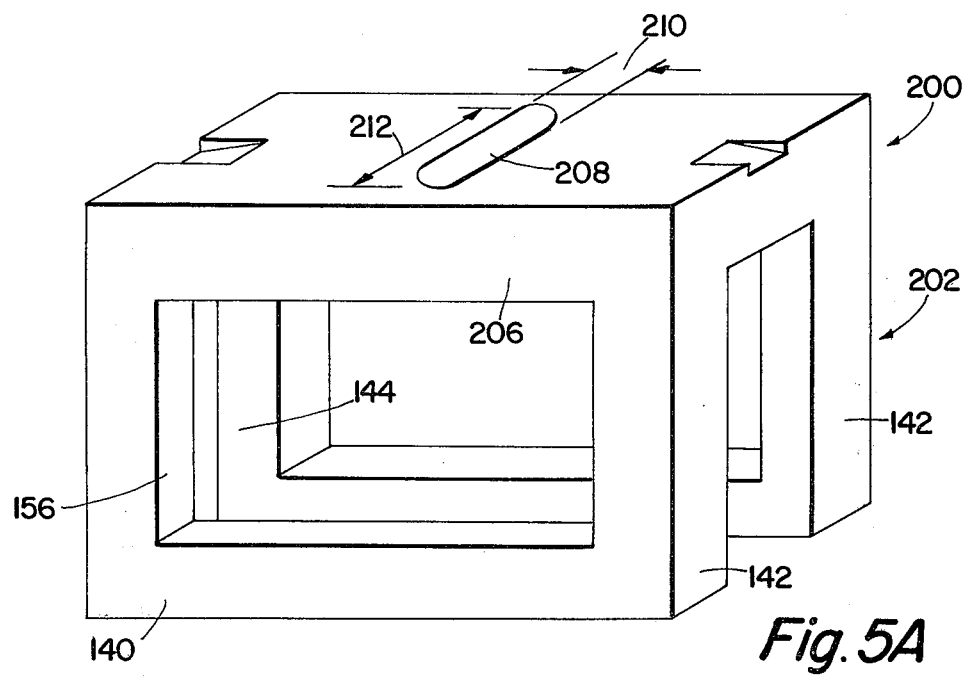
FIGS. 5A and 5B are perspective views of two of the members of another alternate embodiment of the present invention.
Figure 5B:
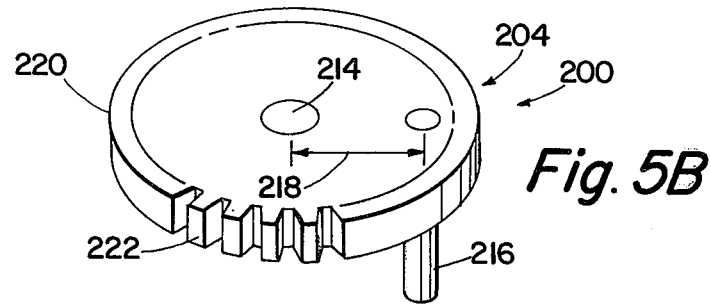

Portions of another alternate embodiment 200 of the present invention may be seen by reference to FIGS. 5A and 5B. With the exceptions of the reaction member 202 and the scotch yoke flywheel assembly 204 of actuator 200, which replace reaction member 124 and the cam assembly, respectively, of the actuator embodiment 100 described above, actuator 200 is structurally substantially identical to actuator embodiment 100 described above.

Reaction member 202 comprises axially extending bottom portions 140, an axially extending top portion 206 and upright portions 142 and 144. A slot 156 is defined between the bottom portions 140, and the upright portions 142 and 144. The structure and function of the bottom portions 140, the upright portions 142 and 144, and the slot 156 is substantially identical to that of similarly identified portions of reaction member 124 described above.

Top portion 206 of reaction member 202 is provided with a slot, preferably a through slot, 208, extending generally perpendicularly to the longitudinal axis of the top portion. Slot 208 is of an axial width 210 and a traverse length 212.

Scotch yoke flywheel 204 is provided with a central aperture 214 for receipt of a shaft member (not shown) about which the flywheel is journalled in the housing for rotational motion. A scotch yoke pin 216 is fixed to the flywheel 214 for rotation therewith and extends downwardly therefrom for sliding receipt in the slot 208 of the top portion 206 of the reaction member 202. The pin 216 is spaced a radial distance 218 from the rotational axis of flywheel 204 which is slightly less than one-half of the traverse length 212 of slot 208. Scotch yoke pin 216 is of an outer diameter, or other similar outer dimension, less than the axial width 210 of slot 208 whereby pin 216 is slidably received in slot 208. The outer radial periphery 220 of flywheel 204 is provided with worm gear teeth 222 for direct driven engagement with the worm teeth of worm 116.

In the alternative, flywheel 204 could be rotationally fixed to a shaft or the like rotationally driven, preferably through a speed reducer, by electric motor 114.

In operation, the actuator 200 is substantially idential to actuator 100 described above except that axial positioning of reaction member 202 relative to the housing is achieved by controlled rotation of the scotch yoke flywheel, 204, of the well known scotch yoke mechanism rather than by a cam and cam followers mechanism. It is recognized that other types of mechanisms, such as sliding block linkages, and the like, may be utilized to transform controlled rotation of an electric motor into selected reciprocal axial movement of the reaction members 124 or 202.

The use of an actuator, similar structurally to actuator 200 described above, as a three position actuator utilizing a unidirectional motor is schematically illustrated in FIGS. 6A–6D. FIGS. 6A–6D illustrate sequencial rotational positions of a scotch yoke flywheel 204 to position the reaction member 202 in an axially centered ("N"), axially rightward ("R") or axially leftward ("L") position. Of course, an additional sensor, similar to sensors 68 and 70 will be required to sense the centered, or "N," position of the reaction member. A modified switch control, similar to control 40, but having three selectable positions, will also be required.

Figure 6A:
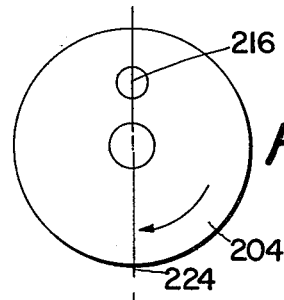
FIGS. 6A–6D are schematic illustrations of the various operating positions of the scotch yoke flywheel of a further alternate embodiment of the present invention similar to the actuator of FIGS. 5A and 5B.

In FIG. 6A, flywheel 204 is in a rotational position whereat scotch yoke pin 216 is not axially displaced from the rotational axis 224 of the flywheel. This position is the axially centered ("N") position of the reaction member 202.

Figure 6C:
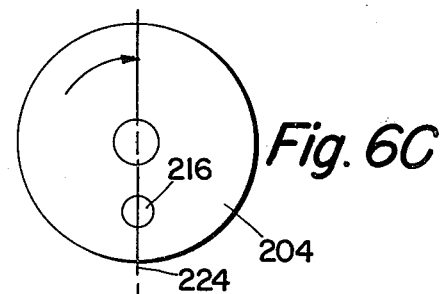
Figure 6B:
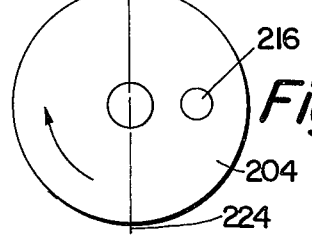

In FIG. 6B, flywheel 204 has been rotated approximately 90° clockwise from the position of FIG. 6A. The pin 216, and thus reaction member 202 are in the rightwardly ("R") axial position.

In FIG. 6C the flywheel 204 has been rotated an additional 90° in the clockwise direction. Pin 216, and thus reaction member 202 are not axially displaced from the rotational axis 224 of the flywheel and thus are back in the "N" axial position.

Figure 6D:
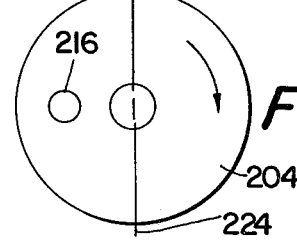

In FIG. 6D the flywheel 204 has been rotated 90° clockwise from the position of FIG. 6C. The pin 216, and thus reaction member 202 are in the leftwardly axial position ("L").

An additional 90° of clockwise rotation will return the flywheel 204, and thus the reaction member 202, to the position of FIG. 6A.

The description of the preferred embodiments is by way of example only and certain changes may be made to the specific embodiments described without departing from the spirit and the scope of the invention as hereinafter claimed.

We claim:

1. A shift actuator for selectively shifting a shift member to a selected one of a least two axially separated positions, said actuator comprising:
   a housing;
   means for engaging said shift member axially slidable in said housing, said means for engaging said shift member effective to engage said shift member and move said shift member axially therewith;
   reaction means axially slidable in said housing, said reaction means axially movable relative to said means for engaging said shift member;
   a resilient biasing means retained in said housing between said means for engaging said shift member and said reaction means;
   a rotational member rotatably mounted in said housing, said rotational member having at least one unique rotational position relative to said housing for engaging said reaction means and positively moving said reaction means to an axial position effective to cause said biasing means to urge said means for engaging said shift member to move said shift member to each of said axially separated positions; and
   means mountable to said housing for selectively rotating said rotational member to a selected one of said unique rotational positions, said means for selectively rotating said rotational member comprising an unidirectional rotational motor.

2. The actuator of claim 1, additionally comprising control means for selective actuation of said motor to rotate said rotational member from one of said rotational positions to another of said rotational positions.

3. The actuator of claim 2, wherein said resilient biasing means comprises an axially compressible coil spring.

4. A shift actuator for selectively shifting a shift member to a selected one of a first and second axially separated positions, said actuator comprising:
   a housing;
   means for engaging said shift member axially slidable in said housing, said means for engaging said shift member effective to engage said shift member and move said shift member axially therewith;
   reaction means axially slidable in said housing, said reaction means axially movable relative to said means for engaging said shift member;
   a resilient biasing means retained in said housing between said means for engaging said shift member and said reaction means;
   a rotational cam rotatably mounted in said housing, said cam having a first rotational position relative to said housing for engaging said reaction means and positively moving said reaction means to a first axial position to cause said biasing means to urge said means for engaging said shift member in said first axial direction, said cam having a second rotational position relative to said housing for engaging said reaction means and positively moving said reaction means to a second axial position to cause said biasing means to urge said means for engaging said shift member in said second axial direction, said first and second rotational positions of said cam rotationally displaced by about 180°, said cam defining a generally smooth continuous radially outwardly convex profile about the entire radially outer periphery thereof; said profile bisectable by a plane containing the axis of rotation of said cam to define substantially mirror image sections on each side of said plane, and
   means mountable to said housing for selectively rotating said cam to a selected one of said first and second rotational positions.

5. The actuator of claim 4, wherein said means for selectively rotating said cam comprises a unidirectional rotational motor.

6. The actuator of claim 4, wherein said actuator includes a control means for selective actuation of said motor to rotate said cam from one of said rotational positions to the other of said rotational positions.

7. The actuator of claim 6, wherein said actuator includes means to sense movement of said reaction means to said first and to said second axial positions and to provide signals indicative thereof to said control means, said control means including means responsive to said signals to cease rotation of said cam by said motor.

8. The actuator of claim 7, wherein said resilient biasing means is a coil spring and movement of said reaction means to said first or second axial positions thereof is effective to resiliently axially compress said coil spring.

9. A shift actuator for selectively shifting a shift member to a selected one of a first and second axially separated positions, said actuator comprising:
   a housing mountable to the device to be shifted;
   a shaft supported in said housing for axial slidable movement relative to said housing, said shaft defining a first abutment surface adjacent one axial end thereof and a second abutment surface adjacent the other axial end thereof, said first abutment surface limited in axial movement relative to said shaft in the direction towards said one end of said shaft and said second abutment suface limited in axial movement relative to said shaft towards the other end of said shaft;
   an abutment plate slidably received on said shaft interposed said first and second abutment surfaces, said abutment plate defining a first plate surface facing the first abutment surface and a second plate surface facing said second abutment surface, said first plate surface and said first abutment surface adapted to receive the shift member therebetween, axial movement of said first abutment surface in the axial direction towards the other end of said shaft effective to cause said first abutment surface to engage said shift member and axially move said shift member therewith, axial movement of said abutment plate in the axial direction toward said one end of said shaft effective to cause said first plate surface to engage said shift member and axially move said shift member therewith;

a resilient biasing means including an axially compresible coil spring retained between said second plate surface of said abutment plate and said second abutment surface, said resilient biasing means effective to urge said abutment plate towrad said first abutment surface;

a rotary cam rotationally mounted in said housing interposed said first abutment suface and said first plate surface, said cam having a first rotational position for positively engaging said first abutment surface in the axial direction toward said one end of said shaft to a first axial position, said cam having a second rotational position rotationally displaced by about 180° from said first rotational position for positively engaging said first plate surface and axially moving said abutment plate in the axial direction toward said other end of said shaft to a second axial position, said cam defining a generally smooth continuous radially outwardly convex profile about the entire radially outer periphery thereof, said profile bisectable by a plane containing the axis of rotation of said cam to define substantially mirror image sections on each side of said plane; and means mountable to said housing for selectively rotating said cam to a selected one of said first and second rotational positions, said means for rotating said cam comprising a unidirectional motor.

10. The actuator of claim 9, wherein a geared drive is interposed the output of said motor and said cam.

11. The actuator of claim 9, wherein said actuator includes a switch control for selective actuation of said motor to rotate said cam to a selected one of said first and second selectable rotational positions.

12. The actuator of claim 11, additionally comprising sensors fixed to said housing for sensing movement of said first abutment surface of said first axial position and providing a signal in response thereto and for sensing movement of said abutment surface to said second axial position and providing a signal in response thereto, said control receiving said signals and operative to cease rotation of said motor in response thereto.

13. A shift actuator for selectively shifting a shift member to a selected one of a first and second axially separated positions, said actuator comprising:

a housing mountable to the device to be shifted;

a slide member supported in said housing for axially slidable movement in said housing to a first axial position relative to said housing and to a second axial position relative to said housing, said slide member adapted to engage said shift member and to axially move said shift member therewith;

a reaction member supported in said housing for axially slidable movement in said housing to said first and second axial positions, said reaction member independently axially movable in said housing relative to said slide member;

a resilient biasing means associated with said slide member and said reaction member for resiliently biasing said slide member to the same axial position relative to said housing as said reaction member; said resilient biasing means comprising a coil spring axially compressible along the axis of sliding of said reaction and slide members;

a rotary cam rotationally mounted in said housing about an axis generally manual to said slide axis, said cam having a first selectable rotational position for engaging said reaction member and positiely axially moving and retaining said reaction member to said first axial position and a second selectable rotational position rotationally displaced by about 180° from said first rotational position for engaging said reaction member and positively moving and retaining said reaction member to said second axial position, said cam defining a generally smooth continuous radially outwardly convex profile about the entire radially outer periphery thereof, said profile bisectable by a plane containing the axis of rotation of said cam to define substantially mirror image sections on each side of said plane; and means mountable to said housing for rotating said cam to a selectable one of said first and second rotational positions.

14. The actuator of claim 13, wherein said means to rotate said cam comprises a unidirectional rotational motor mounted to said housing.

15. The actuator of claim 14, wherein said motor is an electric motor.

16. The actuator of claim 15, additionally comprising a switch control for selective actuation of said motor.

17. The actuator of claim 16, additionally comprising means for sensing movement of said reaction member to said first and said second axial positions and for providing signals in response thereto, said switch control including means for receiving said signals and for terminating rotational movement of said motor in response thereto.

18. The actuator of claim 17, wherein said resilient biasing means additionally comprises spring seat means associated with each of the ends of said coil spring to limit axially outward movement of said coil spring ends, and said slide member and said reaction member each have axially inward facing surfaces on each axial end thereof for engagement with said spring seat means whereby said spring seats have an axially outward position limited by the axially inwardmost one of the slide member and reaction member axially inward surfaces.

19. A shift actuator for selectively shifting a shift member to a selected one of a least two axially separated positions, said actuator comprising:

a housing mountable to the device to be shifted;

a slide member supported in said housing for axially slidable movement in said housing to a unique axial position relative to said housing for each of said at least two axially separated positions of said shift member, said slide member adapted to positively engage said shift member and to axially move said shift member therewith;

a reaction member supported in said housing for axially slidable movement in said housing to each of said unique axial positions, said reaction member independently axially movable in said housing relative to said slide member;

a resilient biasing means associated with said slide member and said reaction member for resiliently biasing said slide member to the same axial position relative to said housing as said reaction member, said resilient biasing means comprising a coil spring axially compressible along the axis of sliding of said reaction and slide members;

a rotary member rotationally mounted in said housing about an axis generally normal to said slide axis of said reaction and slide members, said rotary member having at least one selectable rotational position for engaging said reaction member and positively axially moving and retaining said reaction member to each of said unique axial positions;

means mountable to said housing for rotating said rotary member to a selectable one of said rotational positions, said means to rotate said rotary member comprising a unidirectional rotational motor mounted to said housing; and a switch control for selective actuation of said motor and means for sensing movement of said reaction member to each of said unique axial positions and for providing signals in response thereto, said switch control including means for receiving said signals and for terminating rotational movement of said motor in response thereto.

20. The actuator of claim 19 wherein said slide member comprises a generally "U" shaped body including a first base portion for positively engaging said shift member and upright portions extending upwardly from each end of said first base portion and said reaction member comprises a generally inverted "U" shaped body including a second base portion for positive engagement by said rotary member and leg portions extending downwardly from each end of said second base portion, said leg portions each defining a downwardly extending slot therein for receipt of said upright portions whereby said slide and reaction members can assume the same axial position in said housing relative to said housing.

* * * * *